United States Patent
Cates, II

(10) Patent No.: US 6,261,609 B1
(45) Date of Patent: Jul. 17, 2001

(54) RANGE MINERAL

(76) Inventor: Thomas Gerald Cates, II, P.O. Box 773, Albany, TX (US) 76430

( * ) Notice: Subject to any disclaimer, the term of this patent is extended or adjusted under 35 U.S.C. 154(b) by 0 days.

(21) Appl. No.: 08/248,496

(22) Filed: May 24, 1994

(51) Int. Cl.$^7$ ............ A23K 1/175; A23L 1/303; A23L 1/304
(52) U.S. Cl. .............. 426/73; 426/72; 426/74; 426/807
(58) Field of Search ................ 426/74, 72, 73, 426/2, 623, 630, 635, 636, 807

(56) References Cited

U.S. PATENT DOCUMENTS

| | | | |
|---|---|---|---|
| 4,664,917 | 5/1987 | Meyer | 426/2 |
| 4,704,287 | 11/1987 | Meyer . | |
| 4,729,896 | 3/1988 | Sawhill | 426/2 |
| 4,888,185 | 12/1989 | Miller . | |
| 5,264,227 | 11/1993 | Laroche et al. . | |

FOREIGN PATENT DOCUMENTS

| | | | |
|---|---|---|---|
| 1248404 | 1/1989 | (CA) | 426/74 |
| 2625414 | 7/1989 | (FR) . | |
| 0711349 | 6/1954 | (GB) . | |
| 2191379 | 12/1987 | (GB) . | |
| WO 9103167 | 3/1991 | (WO) . | |

OTHER PUBLICATIONS

Hawley's Condensed Chemical Dictionary, Tenth Ed., Van Nostrand Reinhold Co. (1981), p. 1061.*
Hi–Pro's Mineral Range advertisement.
Acco's Mineral Range Advertisment.
S&S Animal Nutrition's Mineral Range Advertisement.
Vit–A–Way's Mineral Range Advertisement.
Moorman's Mineral Range Advertisement, supp. containing morersin.
Bluebonnet's Mineral Range Advertisement.
Purina's Mineral Range Advertisement.
Moorman's Mineral Range Advertisement, supp. containing methoprene.

* cited by examiner

*Primary Examiner*—Adrienne C. Johnstone
(74) *Attorney, Agent, or Firm*—James Creighton Wray; Meera P. Narasimhan

(57) ABSTRACT

A range feed supplement in granular form for ruminants has about 25% salt, about 30% phosphorus compounds, about 20% sodium bicarbonate, about 10% elemental sulfur, and about 15% other minerals, including trace elements and vitamins. The feed supplements are heterogenous granules of salt, monosodium phosphate, magnesium oxide, potassium chloride, sodium bicarbonate, elemental sulfur, manganese sulfate, zinc sulfate, ferrous sulfate, copper sulfate, ethylenediamine, dihydriodide, cobalt sulfate, sodium selenite, Vitamin A supplement, Vitamin D-3 supplement, Vitamin 3 supplement and cane molasses. Manganese sulfate and potassium sulfate may be added. The mineral mixture is established by cafeteria-style feeding of minerals to ruminants by placing individual minerals in individual bins and by keeping careful records of the amount and kind of individual minerals consumed from the bins, testing grass for mineral content and mixing a feed supplement with little or no mineral present in excess in the grass, and with a substantial amount of mineral selected by the cattle from the feeder bins.

7 Claims, 1 Drawing Sheet

FIG. 1

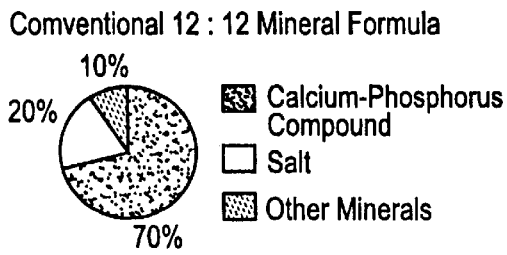

Comventional 12 : 12 Mineral Formula

- Calcium-Phosphorus Compound
- Salt
- Other Minerals

FIG. 2

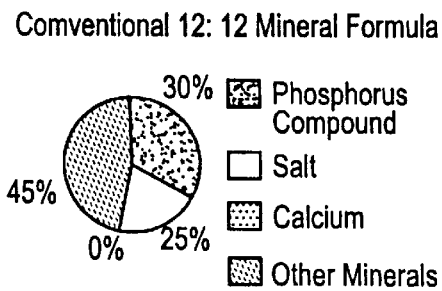

Comventional 12: 12 Mineral Formula

- Phosphorus Compound
- Salt
- Calcium
- Other Minerals

FIG. 3

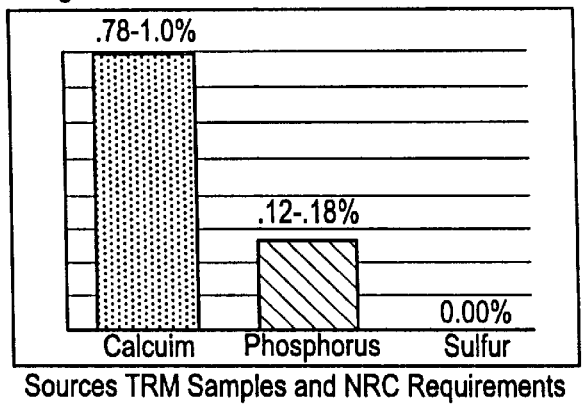

Range Grass Levels

Sources TRM Samples and NRC Requirements

FIG. 4

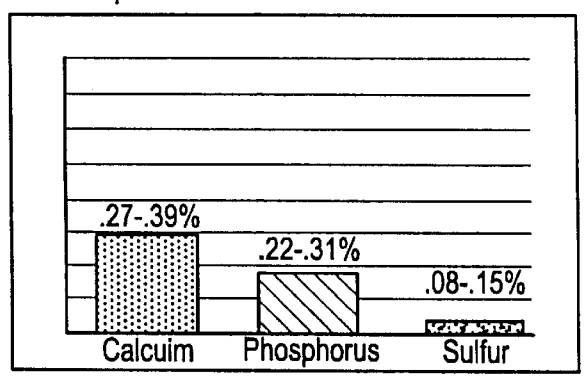

NRC Requirement Levels

Sources TRM Samples and NRC Requirements

FIG. 5

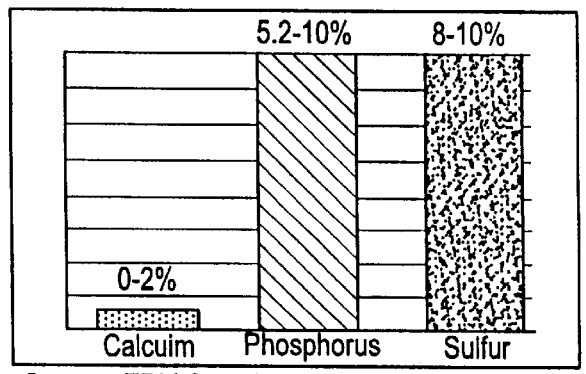

Texas Range Mineral Levels

Sources TRM Samples and NRC Requirements

RANGE MINERAL

BACKGROUND OF THE INVENTION

Ruminants have four stomachs. Ruminants eat quickly and store masses of vegetation in the first chamber of the stomach, the rumen, where the vegetation softens.

The softening of the vegetation is extremely important in range fed cattle. The softening is due to saliva and the content of the saliva, as well as materials which are ingested with the vegetation.

The softened vegetation, called cud, is regurgitated. The cud is chewed with side-to-side grinding movement of the molars.

The chewed cud is swallowed and proceeds to the other chambers of the stomach, the reticulum, the omasum and the abomasum. The chewed material is further digested in those chambers by microorganisms that live in the stomach. It is said that, instead of feeding cattle one feeds the microorganisms, which then insure that the cattle are well fed.

Cattle feed supplements are intended to improve the conditions of microorganisms in the stomach chambers, and to maintain desired levels of minerals and nutrients in the circulatory system to feed cells to provide growth and reproductive support for breeding cattle. Minerals are also necessary to maintain desired contents of saliva to insure desired chemical content of an animal's stomach chambers, and particularly the rumen, to soften vegetation eaten by range animals by providing good conditions for digestive microorganisms in the rumen and in other stomach chambers.

Through years of experience with range feeding a lot of beef cattle and breeding herds, dietary requirements have become known. The National Research Council (NRC) has established mineral ingestion recommendations for cattle.

Minerals have been provided in block form in which minerals are mixed with salt, water and molasses, and are molded under high pressure. Blocks are placed in the field for use by cattle. Granular feeding of minerals has become popular. Granulated minerals are dumped into feeder bins or troughs. The animals are allowed to feed from the troughs by free choice. Sometimes a predetermined amount per head is calculated, and that amount times the number of head in a herd and the number of days between replenishment is placed in the feeders periodically, often two or three times a week.

Cafeteria-style selection has been provided in which individual minerals are placed in separate feeders, with the concept that cattle will choose the mineral supplements which are required. Cafeteria-style feeding requires increased labor.

Manufacturers of mineral supplements have tended to feed materials of similar mixtures, high in calcium. Purina Mills, for example, provides a mineral supplement having about 13% calcium.

Moorman Manufacturing Company of Comanche, Tex. provides mineral supplement of about 13% calcium and about 14.5% calcium.

Friona Industries of Friona, Tex. provides a mineral supplement of about 14% calcium.

S&S Animal Nutrition, Inc. of Morgan Mill, Tex. provides a mineral supplement having about 9.5% calcium.

Vit-A-Way, Inc. of Forth Worth, Tex., provides a mineral supplement having about 22% calcium.

Blue Bonnet Milling of Ardmore, Okla. has a mineral supplement with 11% calcium.

Those percentages are taken as an approximate mean between the stated contents of not less than and not more than. For example, Purina indicates not less than 12% and not more than 14% calcium.

A search for better and improved supplements continues.

SUMMARY OF THE INVENTION

This invention relates to a new range mineral-vitamin supplement for improving the conversion of range grasses into bone and muscle, improving breeding characteristics and increasing weaned calf weight.

The inventor has a degree in agriculture, plus eighteen years of practical experience in range nutrition and ranch management. The inventor managed the mineral program of a large West Texas ranch, feeding cafeteria-style minerals for four years. Afterwards for five years the inventor sold and serviced cafeteria mineral programs.

Over the course of that time, the inventor kept careful records and learned that the minerals cattle selected were markedly different from mineral mixes of conventional mineral supplement supplying companies. Extensive pasture records were documented by the inventor, and extensive grass analyses were taken. It became clear to the inventor that the cattle were selecting what was deficient in the grass, while leaving the minerals that were adequate or in excess in the grass. That research led to the formulation of the mineral supplements described in the present invention.

The present mineral supplements are a result of periodic sampling of grass and water. In addition, the seven major minerals and all of the trace minerals were fed separately and with free choice. Detailed consumption records were kept of the amounts of the minerals consumed. Based on the consumption records, the present formulas were created.

The present invention stems from long experience in feeding minerals cafeteria style with feeders that have separate bins for phosphorus, calcium and sodium, sulfur, potassium, magnesium, salt and keeping good pasture records. While those separate feeder bins were effective, the feeders are costly and labor intensive. The invention also stems from charting all grass records and comparing the grass records with the records of choices in the cafeteria-style feeder bins.

The result is a range mineral formulation that does not have some of the materials that the large scale supplement providers include and has things that the large scale purveyors do not include. The present invention is a new and revolutionary concept of mineral formulation for range cattle. The invention is a blended mineral supplement with all the minerals in balance for optimum conditions in cattle rumens for converting grass to beef. The invention provides better overall herd health with reduction in lumpy jaw, foot rot, woody tongue, pink eye and other disorders and diseases. The invention provides heavier weaned calves, better development of replacements and increase in reproductive efficiencies.

The invention is based on the concept that there can only be 100% of any formula. If a mineral supplement has too much of one mineral, it does not have enough room for other needed minerals.

The invention is based on the zero sum concept. Minerals are often shipped in 50 pound bags for ease of handling in the field. If there is too much supplement that is not needed in each bag, there is a reduced room for the supplement that is needed.

The new concept is straightforward. A good range mineral supplement should supplement what is missing and not supplement what is not missing. That way, the range cattle get all of the needed minerals in proper balance for better herd health and production.

In the past, research of mineral requirements of beef cattle has been done on a basis of maintenance and production, disregarding the requirements for the proper functioning of the animal's immune system, which to a large extent was designed to fight off the attacks of diseases and external and internal parasites. Today, millions of dollars are spent annually on antibiotics and insecticides which are fed as supplements or pumped into one of the main protein sources, beef, for human consumption. One supplement, for example, has methoprene as an insect growth regulator whose formula is isopropyl (E,E)-11-methoxy -3,7,11-trimethyl-2,4-dodecadienoate, which is described in U.S. Pat. Nos. 3,904,662 and 3,912,815. Another mineral supplement of formulation contains chlortetracycline, a powerful antibiotic. Another feed supplement contains lasalocid in the form of lasalocid sodium. A note on that product indicates that the safety of lasalocid in unapproved species has not been established, and cautions not to allow horses access to lasalocid, as ingestion may be fatal, and feeding undiluted or adequately mixed concentrations could be fatal to cattle.

The present invention avoids additives, instead concentrating on precise balancing of naturally available minerals with the minerals in the supplement, making an animal healthy and able to take care of itself. It is known that excesses of some minerals interfere with the uptake of other minerals in desired amounts, thus rendering animals deficient in some minerals, with adverse effects on health, strength, weight and reproductive and disease-fighting capabilities.

While sodium bicarbonate has been added to grain-based ruminant feeds or grain-based feed supplements, it has not been used in a granulated range mineral supplement for use when existing on a diet of available native vegetation.

The present invention places sodium bicarbonate in a mix mixed mineral supplement for range-fed cattle.

The formulas of the present invention have been created in part by observations and records kept from observations, and in part by choices of cattle who have had a significant role in the formulation. As a result, the minerals are in proper balance.

The invention has been created considering the rumen and reticulum generally as large fermentation vats which are full of beneficial flora, bacteria and protozoa, which may be considered beneficial parasites, and in which the flora cooperate with enzymes to begin the breaking apart of cellulose into available carbon, hydrogen, oxygen and nitrogen and minerals and then the synthesizing of the needed amino acids. The present invention is directed to feeding the bugs in the rumen, which in turn feed the cattle. Sodium bicarbonate increases the positive ions charge in the rumens and improves the breakdown of roughage.

In addition to the sodium bicarbonate which the present invention provides for range feed supplements to aid in the softening and digesting of vegetation, the present invention includes as a phosphate source monosodium phosphate, and as a sulfur source elemental sulfur in custom formulated range minerals and vitamin supplements for cattle.

The present invention includes monosodium phosphate as a major phosphate source, and about 5% to 25% sodium bicarbonate. While sodium bicarbonate has been used in dairy and feed lot grain-based feeds, it has not been used in range mineral supplements.

The present invention uniquely provides sodium bicarbonate in a mixed mineral supplement formulated to feed cattle on range conditions with native grass.

The present invention uniquely provides mineral supplements for range feeding of about 1% to 10% potassium chloride, about 20% to 30% monosodium phosphate, about 3% to 10% elemental sulfur, and about 3% to 8% magnesium oxide.

The present invention is especially useful in benefitting the sodium pump mechanism in muscle cells to help regulate relaxation and concentration of the muscle cells. The rumen buffering results of the present invention are important in the function of certain enzymes in the rumen and rumen bacteria. The present invention increases utilization of forage by the increase in the positive ion charge in the rumen. Cattle grazing on native grass and fed cafeteria-style minerals will consume sodium bicarbonate at a rate of up to 25% of the total mineral consumption.

Sodium bicarbonate fed at any level in a mixed range mineral supplement is beneficial. When the minerals of the present invention are fed without sodium bicarbonate, cattle refuse the minerals. When the sodium bicarbonate level is raised, the cattle ingest all of the minerals. Besides being useful in the rumen and later in the muscles and body fluids, sodium bicarbonate helps to establish and maintain sufficient range mineral supplement consumption.

In the absence of sodium bicarbonate the minerals might be rendered attractive to the cattle by a substantial increase in salt. However, the substantial increase in salt would not provide the benefits in the rumen while digesting the native grasses that the sodium bicarbonate presents, because chlorine becomes excessive.

A preferred range mineral supplement in granular form for ruminants has about 25% salt, about 30% phosphorus compounds, about 20% sodium bicarbonate, about 10% elemental sulfur, and about 15% other minerals, including trace elements and vitamins. The feed supplements are heterogenous granules in size of salt, monosodium phosphate, magnesium oxide, potassium chloride, sodium bicarbonate, elemental sulfur, manganese sulfate, zinc sulfate, ferrous sulfate, copper sulfate, ethylenediamine dihydriodide, cobalt sulfate, sodium selenite, Vitamin A supplement, Vitamin D-3 supplement, Vitamin 3 supplement and cane molasses. Manganese sulfate and potassium sulfate may be added.

A range mineral supplement for ruminants has about 20% to 30% sodium salts, about 25% to 35% phosphorus compounds, about 5% to 25% sodium bicarbonate, and the balance sulfur, potassium and magnesium salts, trace elements and vitamins.

The sodium salts comprise chiefly sodium chloride, and the phosphorus compounds comprise chiefly monosodium phosphate.

The trace elements comprise less than 1% manganese, zinc, iron, copper, iodine, fluorine, cobalt and selenium and the vitamins comprise Vitamins A, D-3 and E.

One range mineral supplement for ruminants has from about 27% to 33% sodium chloride, about 5% phosphorus, about 2% magnesium, about 5% potassium, and about 10% elemental sulfur, and less than 1% of the following trace elements: manganese, zinc, iron, copper, iodine, fluorine, cobalt and selenium and wherein the vitamins comprise Vitamins A, D-3 and E.

Another range mineral supplement for ruminants has from about 27% to 33% sodium chloride, about 20% monosodium phosphate, from about 5% to 25% sodium bicarbonate and sodium sesquicarbonate, about 4% magnesium oxide, about 10% potassium chloride, about 10% elemental sulfur, and less than 1% of each of the following vitamins and mineral trace elements: Vitamin A, Vitamin D-3, Vitamin E, manganese, zinc, iron, copper, iodine, fluorine, colbalt and selenium.

Another range mineral supplement for ruminants has from about 22% to 28% sodium chloride, about 30% monosodium phosphate, from about 5% to 25% sodium bicarbonate and sodium sesquicarbonate, about 10% elemental sulfur, about 8% potassium chloride, about 4% magnesium oxide, and about 1% or less of the following mineral trace elements: manganese, zinc, iron, copper, iodine, fluorine, cobalt and selenium.

A preferred range mineral supplement has cane molasses in sufficient quantity to bind sulfur flour granules like powder into the thoroughly mixed mixture and in sufficient quantity for dust control of the sulfur in the thoroughly mixed mixture.

One preferred range mineral supplement has about 22% to about 28% sodium chloride, about 8% phosphorus, about 10% elemental sulfur, about 4% potassium, about 2% magnesium, and about 0.1% or less of the following trace elements: manganese, fluorine, zinc, iron, iodine, copper, cobalt and selenium.

The preferred method of formulation of range mineral supplement for ruminants comprises cafeteria-style feeding of minerals to ruminants by placing individual minerals in individual bins and by keeping careful records of the amount and kind of individual minerals consumed from the bins. Grass is tested for mineral content and a feed supplement is mixed with little or no mineral which is present in excess in the grass, and with a substantial amount of mineral selected by the cattle from the feeder bins.

These and further and other objects and features of the invention are apparent in the disclosure, which includes the above and ongoing written specification, with the claims and the drawings.

BRIEF DESCRIPTION OF THE DRAWINGS

FIG. 1 is a pie chart of conventional mineral supplement formulation.

FIG. 2 is a pie chart of a formulation according to the present invention.

FIG. 3 is a bar chart of an analysis of range grass mineral levels.

FIG. 4 is a bar chart of National Research Council requirement levels for mineral feeds.

FIG. 5 is a bar chart of mineral levels in a range feed supplement of the present invention.

DETAILED DESCRIPTION OF THE DRAWINGS

Referring to FIG. 1, a convention 12:12 mineral formulation of the prior art is shown. The conventional formulation has 20% salt, 70% calcium phosphorus compounds and 10% other minerals.

FIG. 2 shows a formulation of the present invention which includes 0% calcium, 25% salt, 30% phosphorus compounds and 45% other minerals, which includes up to 25% sodium bicarbonate and/or sodium sesquicarbonate.

As shown in FIG. 3, an analysis of some range grass levels in West Texas shows a large amount of calcium, 0.78% to 1.0%, a lower amount of phosphorus, 0.12% to 0.18%, and 0% sulfur.

The National Research Council requirement levels for ruminant foods are shown in FIG. 4. According to the NRC, ruminant foods should have from 0.27% to 0.39% calcium, from 0.22% to 0.31% phosphorus, and from 0.08% to 0.15% sulfur. It is plain from comparing FIGS. 4 and 3 that the range grass has an excess of calcium and is deficient in phosphorus and sulfur.

The applicant's invention as shown in FIG. 5 has 0% to 2% calcium, 5.2% to 10% phosphorus, and 8% to 10% sulfur. The high phosphorus and sulfur levels make up the deficiencies in phosphorus and sulfur which is available from the ruminants' food source, the range grass. The relatively large amount of phosphorus and sulfur in the mineral supplement shown in FIG. 5 takes into account the small amount of mineral supplement ingested by the cattle in comparison with the large amount of range grass.

The substantial non-existence or minor content of calcium in the range mineral supplement of the present invention in contrast with the relatively high calcium content of conventional mineral supplements for ruminants makes room for the increase in phosphorus and sulfur, as required for good nutrition. The low level of calcium in the present invention allows more room in the formula to add other essential minerals such as sulfur, sodium, sodium bicarbonate, potassium, chlorine, magnesium and all of the trace minerals, and Vitamins A, D and a high level of Vitamin E. Preferably the phosphorus comes from monosodium phosphate, the most readily available and soluble source of phosphorus for the support of rumen bacteria. Preferably the sulfur is contained by adding the sulfur in its elemental form as sulfur flour. A small amount of molasses is used in the compounding to prevent the light, fine sulfur from becoming airborne during range winds, upon blowing by feeding cattle and during emptying of sacks into the feeder.

The range grass levels as shown in FIG. 3 has a severe excess of calcium, which raises the pH in the rumen, reduces digestive flora proliferation and decreases the availability of phosphorus, protein, iodine, manganese and zinc.

As shown in FIG. 3, the range grass has a severe deficiency in phosphorus. Adequate phosphorus is needed for energy storage and transfer and is important in conception. Severe deficiency will cause depraved appetite, causing cattle to eat bones, and other strange and unusual feeding materials such as poly pipe, bones, wood, etc.

As shown in FIG. 3, the sulfur is not measurable and therefore is severely deficient. Sulfur fed in elemental form is required in a synthesis of two amino acids and two B vitamins for availability. The requirement for elemental sulfur is increased if NPN is fed.

In all the formulations of the present invention, sodium bicarbonate is included in a range from about 5% to 25%. The sodium bicarbonate, which is novel in range feed supplements for cattle, helps the work of the rumen enzymes and supports flourishing of the bacteria in the rumen, which help to soften the quickly swallowed grasses.

The typical mineral formulation of conventional range feed supplements, as shown on the tags attached to the 50 pound bags of mineral supplements, appears as follows:

| | |
|---|---|
| 70% | calcium/phosphorus compound |
| | monocalcium phosphate |
| | dicalcium phosphate |
| | deflourinated phosphate |

-continued

| | | |
|---|---|---|
| 20% | salt | |
| 5% | grain, yeast, fat and other flavor enhancers | |
| 5% | trace elements and vitamins. | |

The range mineral supplements of the present invention have formulations which look like the following:

EXAMPLE 1

Typical Mineral Formula

| | |
|---|---|
| 0% | calcium phosphorus compound |
| 22–30% | salt |
| 0% | grain, yeast, fat and other flavor enhancers |
| 20–30% | monosodium phosphate (contains no calcium-a sodium salt) |
| 18–22% | sodium bicarbonate |
| 8–10% | elemental sulfur |
| 5–10% | potassium chloride |
| 3–5% | magnesium oxide |
| 3–4% | trace elements and vitamins |
| | calcium carbonate added if calcium is needed. |

EXAMPLE 2

Hill Country Mix

| | | |
|---|---|---|
| phosphorus | min | 7.80% |
| salt | min | 22.50% |
| salt | max | 27.50% |
| magnesium | min | 2.00% |
| potassium | min | 4.00% |
| sulfur | min | 9.94% |
| manganese | min | 0.10% |
| zinc | min | 0.04% |
| iron | min | 0.01% |
| copper | min | 0.005% |
| iodine | min | 0.006% |
| cobalt | min | 0.002% |
| selenium | min | 0.0025% |
| fluorine | max | 0.07% |
| Vitamin A IU/Lb. | min | 200,000 |
| Vitamin D-3 IU/Lb. | min | 40,000 |
| Vitamin E IU/Lb. | min | 201 |

Ingredients:

Salt, monosodium phosphate, magnesium oxide, potassium chloride, sodium bicarbonate, sulfur, manganese sulfate, zinc sulfate, ferrous sulfate, copper sulfate, ethylenediamine dihydriodide, cobalt sulfate, sodium selenite, Vitamin A supplement, Vitamin D-3 supplement, Vitamin E supplement, and cane molasses.

EXAMPLE 3

Rolling Plains Mix

| | | |
|---|---|---|
| phosphorus | min | 5.20% |
| salt | min | 27.50% |
| salt | max | 32.50% |
| magnesium | min | 2.23% |
| potassium | min | 5.38% |
| sulfur | min | 10.48% |
| manganese | min | 0.10% |
| zinc | min | 0.04% |
| iron | min | 0.01% |
| copper | min | 0.005% |
| iodine | min | 0.006% |
| cobalt | min | 0.002% |
| selenium | min | 0.0025% |
| fluorine | max | 0.05% |
| Vitamin A IU/Lb. | min | 200,000 |
| Vitamin D-3 IU/Lb. | min | 40,000 |
| Vitamin E IU/Lb. | min | 200 |

Ingredients:

Salt, monosodium phosphate, magnesium oxide, magnesium sulfate, potassium sulfate, potassium chloride, sodium bicarbonate, sulfur, manganese sulfate, zinc sulfate, ferrous sulfate, copper sulfate, ethylenediamine dihydriodide, cobalt sulfate, sodium selenite, Vitamin A supplement, Vitamin D-3 supplement, Vitamin E supplement, and cane molasses.

EXAMPLE 4

Wheat Pasture Mineral

| | | |
|---|---|---|
| calcium | min | 5.00% |
| calcium | max | 6.00% |
| phosphorus | min | 6.30% |
| salt | min | 20.80% |
| salt | max | 24.95% |
| magnesium | min | 7.56% |
| sulfur | min | 8.67% |
| manganese | min | 0.20% |
| zinc | min | 0.25% |
| iron | min | 0.01% |
| copper | min | 0.09% |
| iodine | min | 0.06% |
| cobalt | min | 0.001% |
| selenium | min | 0.002% |
| fluorine | max | 0.063% |
| Vitamin A IU/Lb. | min | 100,000 |
| Vitamin D-3 IU/Lb. | min | 25,000 |
| Vitamin E IU/Lb. | min | 400 |

Ingredients:

Calcium carbonate, monosodium phosphate, salt, sodium bicarbonate, magnesium oxide, sulfur, manganese sulfate, zinc sulfate, ferrous sulfate, copper sulfate, calcium iodate, cobalt sulfate, sodium selenite, Vitamin A supplement, Vitamin D-3 supplement, Vitamin E supplement, and cane molasses.

Of particular importance is the low or no calcium compound content.

The relatively high phosphate level, which is from monosodium phosphate, is important to achieving the results of the invention, especially in combination with the potassium chloride, the elemental sulfur and the magnesium oxide.

The inclusion of sodium bicarbonate in a mixed mineral supplement formulated to feed cattle eating native grasses on range conditions is a unique inclusion of the present invention, which fosters increased utilization of forage by increasing positive ion charges in the rumen, and by facilitating the function of certain enzymes and bacteria in the rumen.

The unique method of formulation by feeding range animals minerals in a cafeteria style and keeping careful records of the minerals consumed by the cattle over time, by periodically analyzing grass samples from the range, by balancing the calcium and phosphorus compounds and elemental sulfur in the range mineral supplement, and by adding sodium bicarbonate to increase consumption of the mineral supplement and to improve functions of the rumen, are features which make the invention important to cattle range feeding and breeder operations.

While the invention has been described with reference to specific embodiments, modifications and variations of the invention may be constructed without departing from the scope of the invention, which is defined in the following claims.

I claim:

1. A range fed mixed mineral supplement for range grass fed ruminants, comprising about 20% to 30% sodium salts, further comprising about 25% to 35% phosphorus compounds, and additionally comprising about 5% to 25% sodium bicarbonate and sodium sesquicarbonate, and sulfur, potassium and magnesium salts, minerals in trace amounts and vitamins.

2. The range fed mixed mineral supplement for range grass fed ruminants of claim 1, wherein the sodium salts comprise sodium chloride, and the phosphorus compounds comprise monosodium phosphate.

3. The range fed mixed mineral supplement for range grass fed ruminants of claim 1, wherein the minerals in trace amounts comprises less than 1% of each of the following mineral trace elements: manganese, zinc, iron, copper, iodine, fluorine, cobalt and selenium and wherein the vitamins comprise Vitamins A, D-3 and E.

4. The range fed mixed mineral supplement for range grass fed ruminants of claim 1, wherein the supplement comprises about 22% to 28% sodium chloride, about 30% monosodium phosphate, about 10% elemental sulfur, about 8% potassium chloride, about 4% magnesium oxide, and about 1% or less of the following mineral trace elements: manganese, fluorine, zinc, iron, iodine, copper, cobalt and selenium.

5. A range fed mixed mineral supplement for range grass fed ruminants, comprising from about 27% to 33% sodium chloride, about 20% monosodium phosphate, from about 5% to 25% sodium bicarbonate and sodium sesquicarbonate, about 4% magnesium oxide, about 10% potassium chloride, about 10% elemental sulfur, and less than 1% of each of the following vitamins and mineral trace elements: Vitamin A, Vitamin D-3, Vitamin E, manganese, zinc, iron, copper, iodine, fluorine, cobalt and selenium.

6. The range fed mixed mineral supplement for range grass fed ruminants of claim 5, further comprising cane molasses in sufficient quantity for binding components of the mineral supplement and for controlling dust.

7. The range fed mixed mineral supplement for range grass fed ruminants of claim 5, further comprising cane molasses in sufficient quantity to bind and agglomerate components of the mineral supplement.

* * * * *